United States Patent

Beck et al.

[11] Patent Number: 5,621,314
[45] Date of Patent: Apr. 15, 1997

[54] METHOD AND DEVICE FOR DETERMINING THE SPEED OF VEHICLES VIA DERIVING A TRIPPING CURVE

[75] Inventors: Hans-Peter Beck, Welschbillig; Heinz Thiel, Trier-Ehrang; Guido Luban, Newel-Butzweiler, all of Germany

[73] Assignee: Weiss Electronic Elektronische Regel - und Steuergerate GmbH, Trier, Germany

[21] Appl. No.: 510,799

[22] Filed: Aug. 3, 1995

[30] Foreign Application Priority Data

Aug. 4, 1994 [DE] Germany ............... 44 27 549.8

[51] Int. Cl.$^6$ .................... G01F 3/66; G08G 1/01
[52] U.S. Cl. ........................ 324/179; 340/941
[58] Field of Search .................... 340/936–941; 324/178, 179, 234, 236, 166, 160

[56] References Cited

U.S. PATENT DOCUMENTS

| 3,493,954 | 2/1970 | Bartlett et al. ............ | 340/941 X |
| 3,685,013 | 8/1972 | Brickner . | |
| 4,368,428 | 1/1983 | Bijkman ................. | 340/941 X |
| 5,408,179 | 4/1995 | Sampey et al. .......... | 340/941 X |

FOREIGN PATENT DOCUMENTS

| 2648383 | 4/1978 | Germany . |
| 1271643 | 4/1972 | United Kingdom . |
| 2056688 | 3/1981 | United Kingdom . |

OTHER PUBLICATIONS

European Search Report dated 24 Nov. 1995.
Regelungstechnik vol. 1978, No. 9, pp. 291–299.
Patent Abstracts of Japan, P–5, JP 55–13 863, Apr. 4, 1980, vol. 4/No. 43.

Primary Examiner—Sandra L. O'Shea
Assistant Examiner—Roger Phillips
Attorney, Agent, or Firm—Cushman Darby & Cushman IP Group of Pillsbury Madison & Sutro LLP

[57] ABSTRACT

The invention relates to a method and a device for determining the speed ($v=s/\delta t$) of vehicles, in which with the aid of at least two sensors (1, 2, 27, 28) spaced apart from one another (distance s), the time $\delta t = t_1 - t_2$ required to drive over both sensors (1, 2, 27, 28) is ascertained. The object of the invention is to disclose a speed measuring method that is simple to accomplish, with which accurate measurement values are ascertainable, and in which external factors of the pavement can largely be ignored. This is attained essentially by using induction loops, instead of the usual piezoresistive pressure sensors, as the measurement sensors (1, 2, 27, 28). Then, however—unlike known induction loop arrays—what is measured when a vehicle drives over (damps) the loops (1, 2, 27, 28) is not the frequency displacement of a resonant circuit comprising a loop resistor and capacitor, but rather the course over time of the respective loop impedance for a predetermined frequency (tripping curve) (22, 23); and the corresponding time reference value $t_1$, $t_2$ is then ascertained from that course.

12 Claims, 3 Drawing Sheets

METHOD AND DEVICE FOR DETERMINING THE SPEED OF VEHICLES VIA DERIVING A TRIPPING CURVE

FIELD OF THE INVENTION

The invention relates to a method for determining the speed of vehicles with the aid of at least two sensors disposed at a distance (s) from one another, as generically defined by the characteristics of the preamble to claim 1. The invention also relates to a device for performing this method.

BACKGROUND OF THE INVENTION

In stationary speed monitoring systems, as a rule two piezoresistive pressure sensors (piezo cables) disposed in succession in the direction of travel are used, which are mounted-directly on the surface of the road. When a vehicle drives over the two piezo cables and trips them, corresponding voltage pulses are generated, which define two time reference values $t_1$, $t_2$. From the predetermining spacing s of the sensors and the difference $\delta t = t_2 - t_1$, an evaluation unit then ascertains the vehicles speed $v = s/\delta t$.

A primary disadvantage of such pressure sensors is that they are very vulnerable to external factors. Especially in winter, when ice- and snow-covered roads are strewn with gravel and salt, they are easily damaged and must then be replaced, at great expense.

Using induction loop sensors instead of the aforementioned piezoresistive pressure sensors would indeed lead to sensor arrays that are largely invulnerable to external factors, because the induction loops can be embedded approximately 5 to 10 cm deep in the pavement, but measuring the vehicle speed with such known sensor arrays is generally too imprecise. This is because the induction loops usually form the inductive portion of the resonant circuit of an LC oscillator, whose capacitor is a component of an evaluation unit that is located at a site separate from the measurement site and is connected to the induction loops over relatively long feeder lines. The vulnerability of this kind of sensor array is substantially impaired, however, by the entry of extraneous signals, for instance from nearby induction loops, and by the ohmic feeder line resistances, but also by the required low-impedance output of the end stage of the loop.

OBJECT AND SUMMARY OF THE INVENTION

It is therefore the object of the invention to disclose a method for determining the speed of vehicles that is simple to achieve, with which accurate measured values can be ascertained, and in which external factors of the pavement can be largely ignored. It is also the object of the invention to disclose a device for carrying out this method.

The aforementioned object is attained in accordance with the invention by the characteristics of the body of claim 1, as to the method, and of the body of claim 4, as to the device.

Further especially advantageous features of the invention are disclosed in the dependent claims.

The invention is based essentially on the concept of using induction loops as measurement sensors, instead of the usual piezoresistive pressure sensors. However—unlike the situation in known induction loop arrays—it is not the frequency shift of a resonant circuit, comprising a loop inductance and a capacitor, when a vehicle drives over the coil (damping it), but rather the course over time of the respective loop impedance for a predetermined frequency (tripping curve, when the vehicle drives over the induction loops), and the corresponding time reference value is ascertained from this course.

This measurement method is especially accurate if to obtain the time reference values, the center of curvature of the respective tripping curve is ascertained, instead of the leading or trailing edge of the corresponding tripping curve, and if the time value assigned to this center of curvature value is then used as the time reference value for determining the time difference. This is because the effects of signal noise on these time reference values are as a rule very slight.

Especially advantageously, the method of the invention can be used in double measurement, which is frequently required, in which two speed measurements are made with a different time base and then weighted. To that end, each of the induction coils is merely connected to two impedance measuring devices, which are operated at different measurement frequencies. The measuring devices can be operated in parallel, so that—unlike devices that have multiplexers—the measured value processing can be done extraordinarily fast.

The device for performing the measurement substantially comprises at least two induction coils, whose evaluation devices each include an impedance measuring device. The respective impedance device has a measurement voltage source to generate an alternating voltage of predeterminable frequency (measurement frequency) and a detector, which to measure the loop voltage contains a synchronous rectifier followed by a low-pass filter. The control input of the synchronous rectifier is likewise connected to the measurement voltage source.

Since the induction loop—unlike the situation in known loop arrays—is not part of an oscillator, the loop end stage of the measurement voltage source can be embodied with high impedance. Because of the high-impedance loop end stage and the high frequency selectivity of the detector, it is possible to provide loop arrays spaced closely to one another, without problems being caused by extraneous signals without a loss of sensitivity caused by mutual drawing of energy.

The high signal to noise ratio attainable with the detectors according to the invention makes it possible even to detect motorcycles, which as a rule cause only a weak change in impedance of the loop, The use of an analog multiplier as the synchronous rectifier is especially advantageous, since the sinusoidal measurement voltage (with a low nonlinear distortion factor) is used directly as the control voltage. Since in the ideal case there is only one frequency in the control frequency (measurement frequency), only the amplitude of the voltage contained in the frequency mixture of the input voltage is evaluated with the measurement frequency, and thus all the other interfering signals are suppressed. Synchronous rectifiers, in which the polarity of the input voltage is switched over via a rectangular signal generated from the control voltage, while fundamentally usable in combination with the detectors of the evaluation device according to the invention, nevertheless has a disadvantage that depending on the proportion in the Fourrier series of the controlling rectangular signal, odd-numbered multiples of the measurement frequency can also make some contribution to the direct voltage at the output. Since the harmonic components of the rectangular signal are damped only slightly relative to the fundamental oscillation, interference can arise in the direct voltage from demodulation of long-wave transmitters, for instance, or for measurement frequencies of the nearby loops.

Since in the usual synchronous rectifiers the output voltage is dependent on the phase displacement between the control voltage in the measurement voltage (phase-sensitive synchronous rectifiers), it has proved advantageous for the phase displacement, caused by the induction loop and/or the feeder lines, to be compensated for by means of an adjustable—preferably, processor-controlled—phase shifter. This phase shifter can for instance be integrated with the loop end stage. As a result of the compensation for the phase displacement with the aid of the phase shifter, the total circuit has the effect that the synchronous rectifier functions virtually independently of phase, since at a set phase of 0°, upon damping, phase changes of less than 5° result. For such small changes in phase, cos Φ can be set equal to 1, in a good approximation.

Instead of a phase-sensitive synchronous rectifier with a separate phase shifter, it is naturally also possible to use a phase-independent synchronous rectifier. Such synchronous rectifiers are relatively complicated to make, however, and therefore entail correspondingly high costs.

For further evaluation of the signal values located at the output of the low-pass filter, these signals are carried via an analog/digital converter to a microcontroller, which determines both the center of curvature of the particular tripping curve, the time reference values, and from those values determines the vehicle speed.

If the measurement values of a plurality of detectors are to be evaluated with the same microcontroller, then the detectors can be connected in a manner known per se to the microcontroller or the A/D converter preceding it via a multiplexer.

If multiple measurement of the speed with a plurality of mutually independent time bases is necessary, then naturally a member of clock generators corresponding to the number of time bases can be used. In this case, it has proved to be advantageous to use a plurality of microcontrollers, with one microcontroller being used for each speed measurement of the multiple measurement. The corresponding clock generator of the respective microcontroller then determines the corresponding time base.

Further details and advantages of the invention will become apparent from the ensuing description of exemplary embodiments in conjunction with the drawing.

DESCRIPTION OF THE PREFERRED EMBODIMENTS

Figure 1:
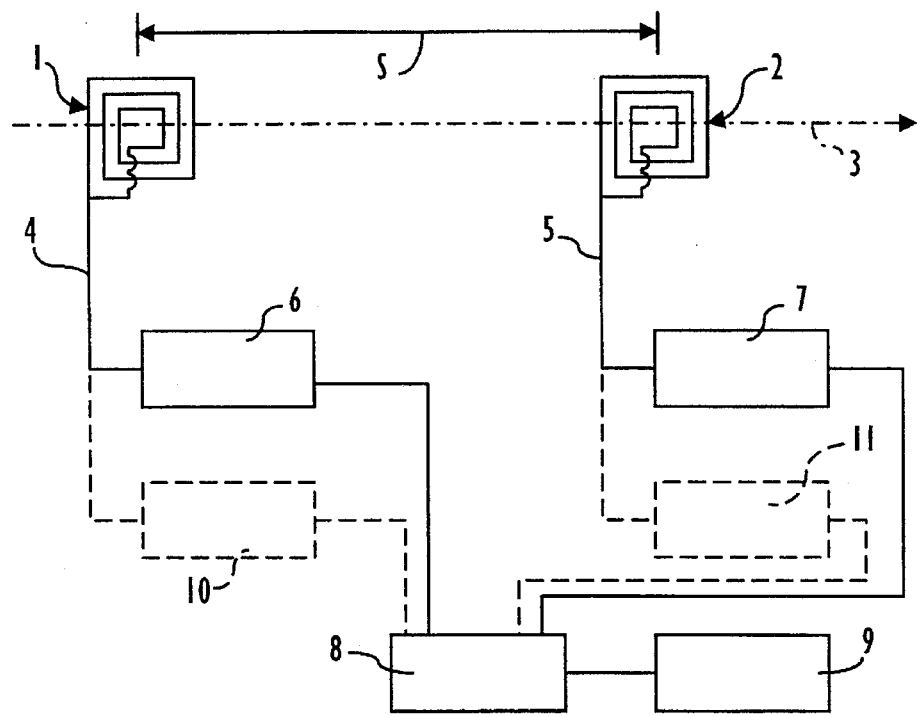
FIG. 1 is a block circuit diagram of a measuring device according to the invention.

FIG. 1 shows induction loops 1 and 2. The induction loops 1, 2 are spaced apart by the distance (measurement base) s in the direction of travel 3 of the vehicles (not shown) whose speed is to be determined. Each of the two induction loops 1, 2 is connected via a connecting line 4, 5 to an evaluation unit 6 and 7, respectively, for ascertaining the respective loop impedance Z1, Z2 and the measured value voltages $Ua_1$, $Ua_2$ proportional to these impedances.

In a microcontroller 8 downstream of the evaluation devices 6 and 7, the corresponding time reference values $t_1$, $t_2$ are then ascertained from the tripping curves $Z_1(t)$, $Z_2(t)$, and $Ua_1(t)$, $Ua_2(t)$, and then the vehicle speed v is ascertained, and optionally indicated by means of a display device 9.

For performing a double measurement of the speed, FIG. 1 in broken lines outlines two further evaluation devices 10, 11, each likewise connected to the induction loops 1 and 2, respectively, and to the microcontroller 8.

Figure 2:
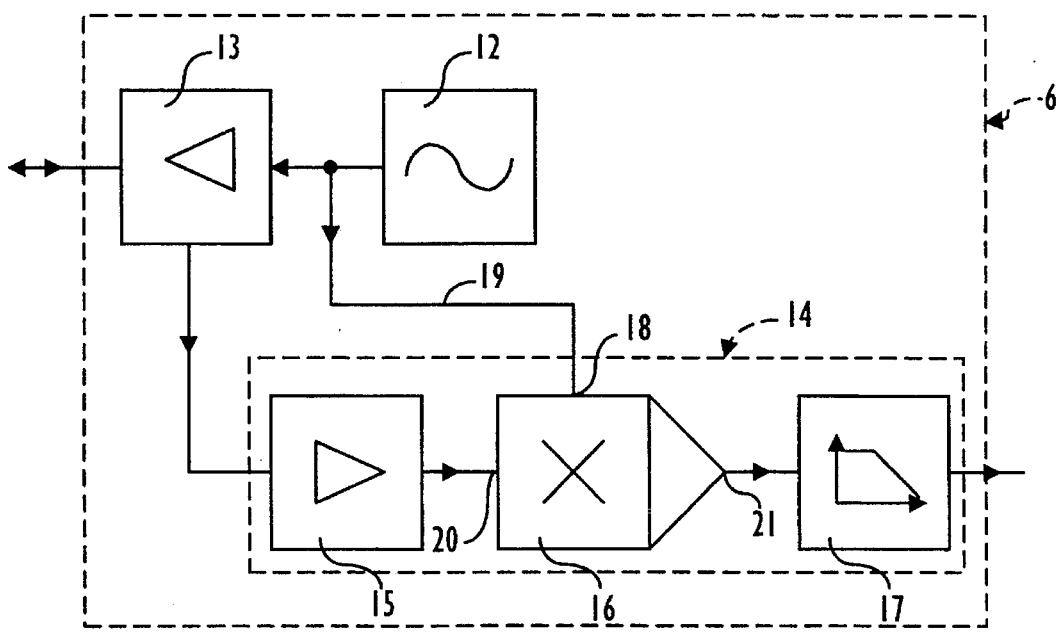
FIG. 2 is a block circuit diagram of an evaluation device.

FIG. 2 shows the block circuit diagram of the evaluation device 6 (evaluation devices 7, 10 and 11 have a similar design). The evaluation device is essentially an impedance measuring device, which comprises a measurement voltage source 12 followed by a loop end stage 13 and a detector 14, for measuring the loop voltage.

The detector 14 includes a signal amplifier 15, whose output voltage is delivered to a phase-sensitive synchronous rectifier (analog multiplier) 16, which is followed in turn by a low-pass filter 17. The respective control input 18 of the synchronous rectifier 16 is connected to the measurement voltage source 12 via an electric line 19.

The loop end stage 13 substantially comprises a signal amplifier for amplifying the frequency- and amplitude-stable sinusoidal alternating voltage generated by the measurement voltage source 12, and it has a high-impedance output. The loop end stage 13 also includes a phase shifter, by means of which the phase of the voltage values at the induction loop can be varied.

The function of the evaluation device will now be described in further detail:

While at the input 20 of the synchronous rectifier (analog multiplier) 16, if there is no source of interference, the voltage measured at the loop 1 and amplified by means of the amplifier 15 (hereinafter also called measurement voltage) is as follows:

$$U_e(t) = \hat{u}_e * \sin(2\pi f_{st} * t + \Phi)$$

the voltage located at the control input 18 of the synchronous rectifier has the following course:

$$U_{st}(t) = \hat{u}_{st} * \sin(2\pi f_{st} * t),$$

where $f_{st}$ is the frequency of the control voltage $U_{st}$ generated by the measurement voltage source 12, and Φ is the phase displacement between the control voltage $U_{st}$ and the measurement voltage $U_e$, which can be compensated for with the aid of the phase shifter disposed in the loop end stage 13.

While the variables $\hat{u}_{st}$ and $f_{st}$ are constant, $\hat{u}_e$ and Φ vary upon damping, or in other words when a vehicle drives over the induction loop 1.

The following course thus results for the voltage $U_A$ at the output 21 of the multiplier 16:

$$U_A(t) = (U_e(t) * U_{st}(t))/E,$$

where E is a calculation unit of the multiplier (such as 10 V). If $$\sin\alpha * \sin\beta = 0.5 * [cs(\alpha - \beta) - \cos(\alpha + \beta)]$$

then:

$$U_A(t)=0.5*\hat{u}_e*\hat{u}_{st}/E*[\cos\Phi-\cos(4\pi f_{st}*t+\Phi)]=U_=+U_\approx.$$

Accordingly, a direct voltage on which an alternating voltage with twice the measurement frequency is superimposed is the result. Since with the phase shifter the phase $\Phi$ is compensated for, or in other words $$\Phi=0, \cos(\Phi)=1,$$

then:

$$U_A(t)=0.5*\hat{u}_e*\hat{u}_{st}/E*[1-\cos(4\pi f_{st}*t)]=U_=+U_\approx$$

That is, in this case, the direct voltage $U_=$ upon damping is independent of the phase $\Phi$.

If the measurement voltage includes some interference frequency from a nearby loop, for instance of $f=f_{st}+5$ kHz, then the output voltage $U_A(t)$ includes two additional frequencies:

$$f_1=5 \text{ kHz and } f_2=2f_{st}+5 \text{ kHz}.$$

The low-pass filter 17 downstream of the synchronous rectifier 16 now has the task of filtering out all the spectra, except for the direct voltage $U_=$ caused by the measurement frequencies, by means of averaging. In a low-pass filter with the limit frequency $f_{gTP}=0$ Hz, an output voltage as follows would (theoretically) result:

$$U_A(t)=U_==0.5*\hat{u}_e*\hat{u}_{st}/E$$

That is, only the voltage $U_e$ furnishes a component of the output voltage of the low-pass filter, whose frequency is equal to the control frequency and thus, as desired, is also equal to the measurement frequency. Because of the infinitely large time constant of the low-pass filter, however, no time changes in the output voltage would be possible at this limit frequency.

For a limit frequency $f_{gTP}>0$ Hz, it is no longer a certain frequency but rather a frequency band that is filtered out of the mixed signal of $U_e$. With respect to the measurement frequency, the circuit accordingly performs like a bandpass filter with the bandwidth $B=2 f_{gTP}$ and the mean frequency $f_M=f_{st}=f_{Me\beta}$.

The low-pass filter 17 accordingly determines the properties of the entire circuit and must be designed such that it meets the demands for rise time, transient response, noise suppression, and so forth (for example, 4th Order Bessel-TP, with $f_{gTP}=100$ Hz).

If one looks at the direct voltage component used for the detection, $$U_==0.5*\hat{u}_e*\hat{u}_{st}/E,$$

then it is apparent that the output voltage is proportional to the amplitude $\hat{u}_e$ of the loop voltage $U_e(t)$. However, the induction loop 1 is triggered by a large resistor (high-impedance output of the loop end stage 13), so that the current is virtually constant. It follows that the direct voltage component $U_=$ is proportional to the amount of the loop impedance $|Z|$ (that is, $Z=U/I$).

Figure 3:
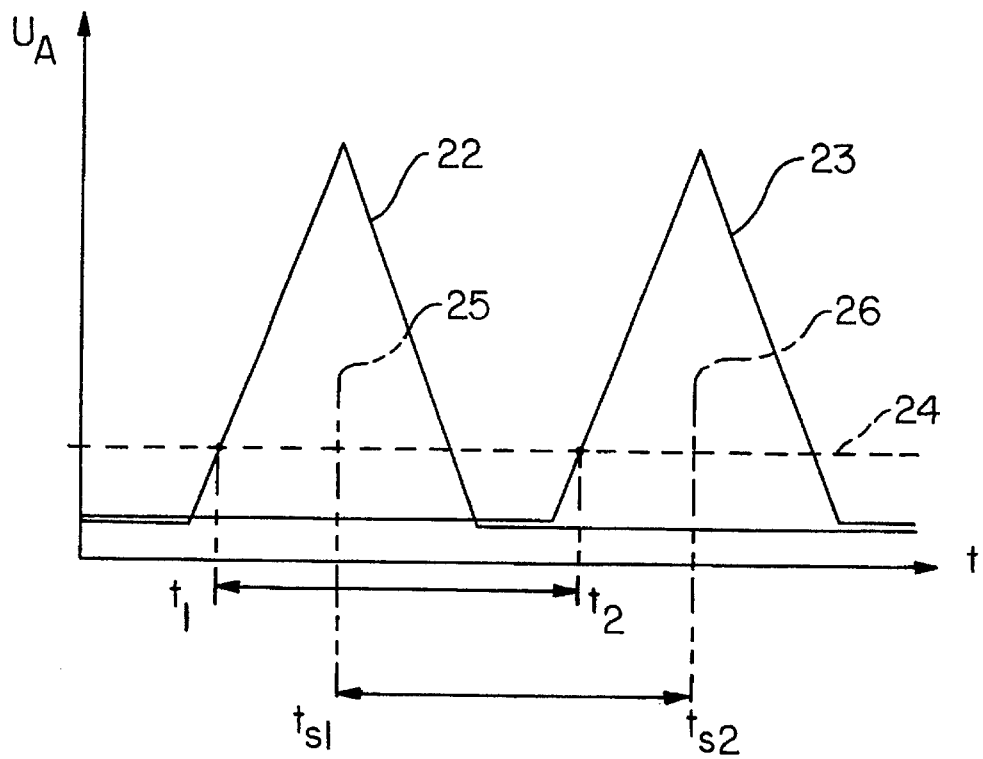
FIG. 3 shows the schematic course of two drive over curves for deriving corresponding time reference values.

FIG. 3 schematically shows the voltage source $U_A$ at the output of the evaluation devices 6 and 7 as a motor vehicle drives over the induction loops 1 and 2. The curve 22 corresponds to the tripping curve measured with the evaluation device 6, and the curve 23 to the tripping curve measured with the evaluation device 7.

For deriving the time reference values $t_1$ and $t_2$, in the simplest case a threshold weighting known per se can be done, with the aid of the microcontroller 8. To that end, the tripping curves 22, 23 are compared with a constant threshold value 24. As soon as the tripping curve 22 exceeds the threshold value 24, a first time reference value is regenerated. If the tripping curve 23 next likewise exceeds the threshold value 24, then a second time reference value $t_2$ is generated. The driveover time $\delta t$ to be determined is then obtained from the equation $\delta t=t_2-t_1$.

In terms of circuitry, this kind of time measuring circuit can be embodied by two comparators, which are connected by a corresponding flip-flop. The flip-flop then forms a gate signal corresponding to $\delta t$, and this signal is then counted out by means of a counter of predetermined accuracy. Naturally, the time measuring device can also be achieved by software. Since such time measuring devices are well known, their design need not be discussed further here.

One essential disadvantage of the above-described threshold weighting for deriving time reference values is that even slight disturbances in the tripping curves in the region of the thresholds 24 cause major adulteration of the speed measurement.

A more exact speed measurement is obtained if the so-called center of curvature method is used for deriving the time reference values. In this method, the two tripping curves 22, 23 are integrated with the aid of an integrator (in the form of either hardware or software) contained in the microcontroller, and then the position of each center of curvature 25, 26 (FIG. 3) is ascertained. From the time interval between the two centers of curvature $\delta t_{sp}=t_{s1}-t_{s2}$ of the curve in the measurement base s, the speed is then obtained. Slight disturbances do not have such a pronounced effect as in the threshold value method, because of the integrator of the curves.

To achieve a double measurement, two independent measurement systems must be used in the center of curvature method, since each measurement system can furnish only one speed. For this purpose, the induction loops 1, 2 (FIG. 1) are preferably each connected to two evaluation devices 6, 10 and 7, 11, respectively. The evaluation devices connected to each induction loop generate completely separate measurement signals, which however (depending on the configuration of the equipment) must have a minimum frequency interval of 1 kHz, for instance, from one another. Evaluating of the loop damping also takes place separately from one another.

Naturally it is also possible to carry out a triple or quadruple measurement, and so forth, instead of a double measurement. In those cases, three or four evaluation devices, and so forth, operating at different measurement frequency, are each connected to one induction loop.

Figure 4A:
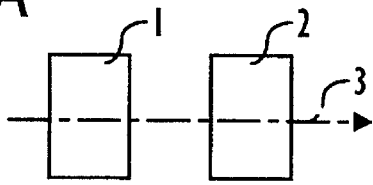
FIGS. 4A), 4B), and 4C) are schematic illustrations of a plurality of induction loops, disposed one after the other, for finding various time bases.

The number of induction loops required for determining the speed can also include more than two loops. This is suggested in FIGS. 4A) through 4C). FIG. 4A) once again shows the two loops 1 and 2 (one measurement base) disposed one after the other in the direction of travel 3.

Figure 4B:
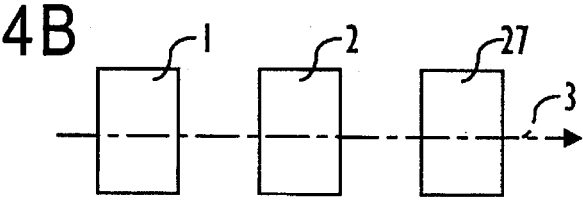
Figure 4C:
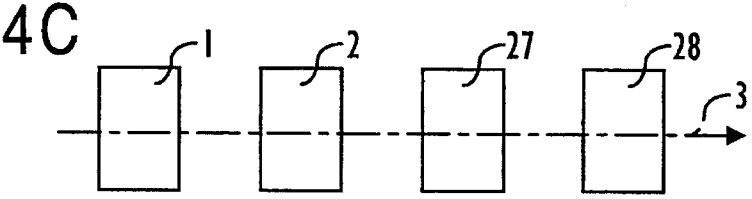
Figure 5:
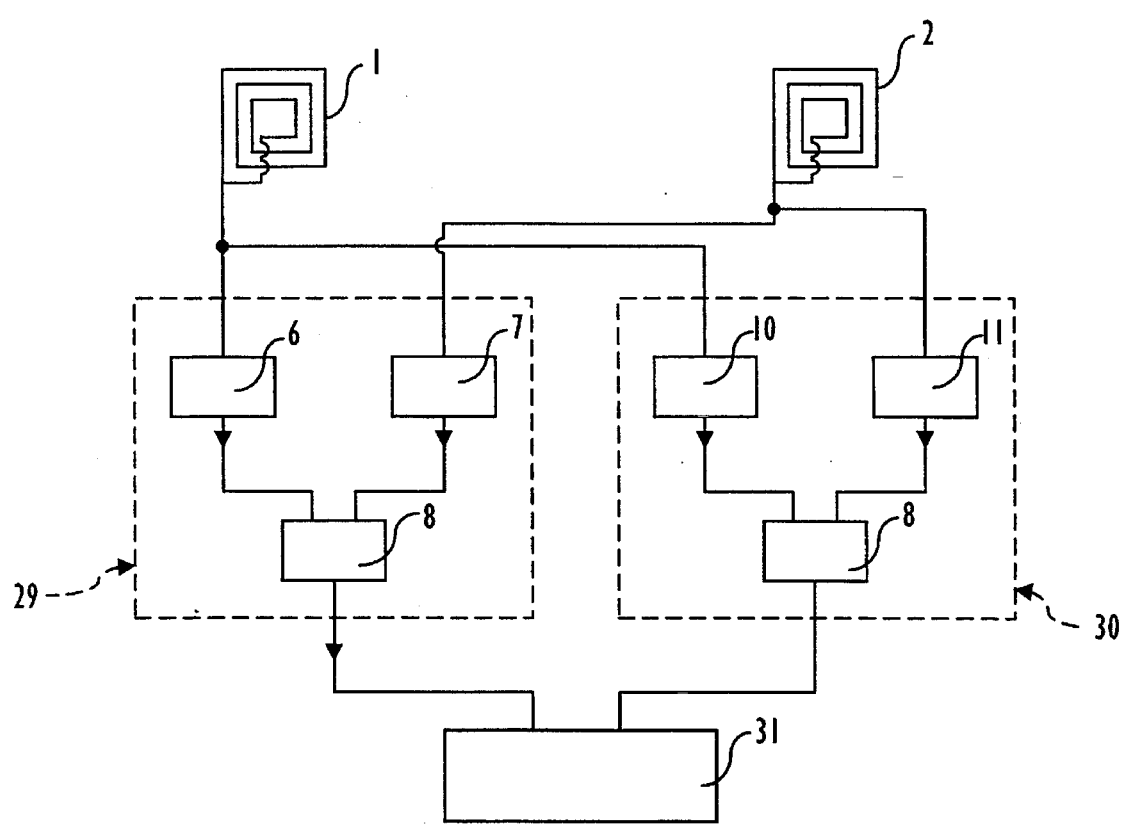
FIG. 5 is a block circuit diagram of a measuring device according to the invention for double measurement of the speed with two different time bases.

FIG. 4B) shows an induction loop array with three loops 1, 2 and 27, which define three measurement bases (with spacings or intervals between the induction loops 1 and 2, 2 and 3 and 1 and 3). Finally, FIG. 4C) shows four induction loops 1, 2, 27 and 28, disposed one after the other and defining a total of six measurement bases.

To make the measurement even more secure, the center of curvature method and the threshold value method can also be coupled to one another; monitoring of the center of curvature method is done by using a plurality of thresholds disposed one above the other.

Instead of each leading edge of the tripping curves 22, 23, it is naturally also possible to use the respective trailing edge to derive time reference values. In that case, time reference values will always be tripped whenever the particular tripping curve is below the threshold values. For a double measurement, it is also possible to use both edges to generate time reference values, so that unlike the center of curvature method, no additional measurement system is needed.

FIG. 4 shows an exemplary embodiment for a double measurement of the speed using two mutually independent time bases. The measurement device is essentially equivalent to the device shown in FIG. 1. However, the evaluation devices 6 and 7, on the one hand, and 10 and 11, on the other, are each connected with their own microcontroller 8' and 8", respectively, and form two separate measurement systems 29 and 30. The period length (or a value derived from it) of the pulses of the clock generator of the respective microcontroller 8' and 8" defines the time base for the speeds $v_1$ and $v_2$ ascertained with the respective controller 8' and 8".

The measurement systems 29 and 30 are connected to a further evaluation unit 31, which conducts the comparison of the two speed measurement values $v_1$ and $v_2$, further processes these values as applicable, and causes them to be displayed.

We claim:

1. A method for determining the speed of vehicles comprising the steps of using induction coils as sensors which are spaced apart a selected distance, determining the time needed for driving past both induction coils, measuring over time the respective coil impedances for a predetermined frequency and deriving the time reference values therefrom, wherein the step of measuring the respective coil impedances for a predetermined frequency comprises deriving a tripping curve where the respective coil impedances are proportional to the measured voltages and including the step of determining the respective center of curvature of each corresponding tripping curve, a time value being associated with the respective center of curvature to determine the time required to drive over both induction coils.

2. The method as claimed in claim 1 wherein a multiple measurement of the vehicle speed is made with each coil impedance measured with a corresponding number of voltage signals of different frequencies.

3. A device for determining the speed of vehicles comprising at least two induction coils located at a distance and spaced apart from one another, said induction coils being connected to at least one evaluation device, said evaluation device comprising an impedance measuring device including a measurement voltage source for generating an alternating voltage of predetermined frequency and a detector for measuring the loop voltage, said detector comprising a synchronous rectifier followed by a low-pass filter, said synchronous rectifier having a control input connected to the measurement voltage source.

4. The device of claim 3, wherein between the measurement voltage source (12) and the induction loop, a loop end stage (13) is provided, which includes a signal amplifier with a high-impedance output resistor.

5. The device of claim 4, wherein the loop end stage (13) additionally has a phase shifter for varying the phase of the loop voltage applied to the induction loop.

6. The device of claim 5, wherein the phase shifter is controllable by a processor.

7. The device of claim 6 the synchronous rectifier (16) is an analog multiplier.

8. The device of claim 7 wherein, the synchronous rectifier (16) is a phase-independent synchronous rectifier.

9. The device of claim 8 wherein a signal voltage amplifier (15) is disposed between the induction loop and the synchronous rectifier (16).

10. The device of claim 9 wherein the output of the low-pass filter (17) following the synchronous rectifier (16), for further evaluation of the measured loop signals, is connected to a microcontroller.

11. The device of claim 10 wherein in the event of a multiple measurement of the vehicle speed, each induction loop is connected to a corresponding number of evaluation devices, and each evaluation device associated with an induction loop operates at a different measurement frequency.

12. The device of claim 11, wherein the evaluation devices, required in the multiple measurement for ascertaining one speed value each, are connected each with their own microcontroller, and that a further evaluation unit (31) is connected downstream of the individual microcontrollers.

* * * * *